US012485050B2

(12) United States Patent
Maho et al.

(10) Patent No.: US 12,485,050 B2
(45) Date of Patent: Dec. 2, 2025

(54) MATTRESS SYSTEM

(71) Applicant: Hill-Rom Services, Inc., Batesville, IN (US)

(72) Inventors: Mikael Maho, Pluvigner (FR); Anthony Thepaut, Pluneret (FR); Etienne Yvernault, Brech (FR); Pierre-Yves Le Naour, Quimperle (FR); David Guyot, Landaul (FR)

(73) Assignee: Hill-Rom Services, Inc., Batesville, IN (US)

( * ) Notice: Subject to any disclaimer, the term of this patent is extended or adjusted under 35 U.S.C. 154(b) by 166 days.

(21) Appl. No.: 16/795,879

(22) Filed: Feb. 20, 2020

(65) Prior Publication Data

US 2021/0259899 A1 Aug. 26, 2021

(51) Int. Cl.

| | |
|---|---|
| ***A61G 7/057*** | (2006.01) |
| ***A47C 27/08*** | (2006.01) |
| ***A47C 27/10*** | (2006.01) |
| ***A61G 1/02*** | (2006.01) |
| ***A61G 1/04*** | (2006.01) |
| ***A61G 13/06*** | (2006.01) |
| ***A61G 13/10*** | (2006.01) |

(52) U.S. Cl.

CPC ..... *A61G 7/05776* (2013.01); *A61G 7/05723* (2013.01); *A47C 27/08* (2013.01); *A47C 27/10* (2013.01); *A61G 1/02* (2013.01); *A61G 1/04* (2013.01); *A61G 13/06* (2013.01); *A61G 13/10* (2013.01)

(58) Field of Classification Search

CPC ............ A61G 7/05776; A61G 7/05723; A61G 7/05707; A61G 7/012; A61G 7/015; A61G 7/05; A61G 7/05769; A61G 13/06; A61G 13/08; A61G 13/10; A61G 1/013; A61G 1/02; A61G 1/04; A47C 27/10; A47C 27/082; A47C 27/083; A47C 27/081; A47C 27/08; A47C 27/088

See application file for complete search history.

(56) References Cited

U.S. PATENT DOCUMENTS

| | | | |
|---|---|---|---|
| 3,317,934 | A | 5/1967 | Hinrichs |
| 3,653,083 | A | 4/1972 | Lapidus |
| 4,068,334 | A | 1/1978 | Randall |
| 4,193,149 | A | 3/1980 | Welch |

(Continued)

FOREIGN PATENT DOCUMENTS

| | | | |
|---|---|---|---|
| AU | 2005277503 | A1 | 3/2006 |
| AU | 2006214230 | B2 | 10/2009 |

(Continued)

*Primary Examiner* — Matthew Troutman
*Assistant Examiner* — Morgan J McClure
(74) *Attorney, Agent, or Firm* — Price Heneveld LLP

(57) ABSTRACT

A patient support apparatus includes a mattress that defines a plurality of grooves. A bladder is disposed within each groove. Each bladder is operable between a deployed state and a non-deployed state. A flap is disposed adjacent to each groove. Each flap includes a broad contact surface and a narrow contact surface. A manifold is in fluid communication with each bladder. The manifold is configured to direct fluid into each bladder to adjust the bladders between the deployed state and the non-deployed state, and consequently move the flaps between a raised position and a lowered position, respectively.

19 Claims, 8 Drawing Sheets

(56) References Cited

U.S. PATENT DOCUMENTS 4,391,009 A 7/1983 Schild et al.
4,711,275 A 12/1987 Ford et al.
4,977,480 A * 12/1990 Nishihara ............. G01L 9/0072 361/283.4
4,989,283 A 2/1991 Krouskop
4,991,244 A 2/1991 Walker
4,995,124 A 2/1991 Wridge, Jr. et al.
5,010,608 A 4/1991 Barnett et al.
5,029,939 A 7/1991 Smith et al.
5,109,561 A 5/1992 Schild
5,117,518 A 6/1992 Schild
5,138,729 A 8/1992 Ferrand
5,142,717 A 9/1992 Everard et al.
5,152,319 A 10/1992 Hannagan et al.
5,251,349 A 10/1993 Thomas et al.
5,277,474 A 1/1994 Hannagan et al.
5,388,292 A * 2/1995 Stinson ................ A47C 27/001 5/709
5,556,169 A 9/1996 Parrish et al.
5,662,384 A 9/1997 O'Neill et al.
5,787,531 A * 8/1998 Pepe .................... A47C 27/081 5/710
5,815,865 A 10/1998 Washburn et al.
5,906,205 A 5/1999 Hiebert
5,920,934 A 7/1999 Hannagan et al.
6,047,423 A * 4/2000 Larson ................. A47C 27/082 5/709
6,092,249 A 7/2000 Kamen et al.
6,148,461 A 11/2000 Cook et al.
6,154,907 A 12/2000 Cinquin
6,163,909 A 12/2000 Lin
6,192,538 B1 * 2/2001 Fogel ................. A61G 7/05715 5/727
6,201,481 B1 * 3/2001 Bellingroth .......... A47C 20/041 340/680
6,216,300 B1 4/2001 Hannagan
6,269,505 B1 * 8/2001 Wilkinson ........... A47C 27/084 5/654
6,282,737 B1 9/2001 Vrzalik
6,286,167 B1 9/2001 Stolpmann
6,317,912 B1 11/2001 Graebe et al.
6,349,439 B1 * 2/2002 Cook ................. A61G 7/05776 5/713
6,367,106 B1 * 4/2002 Gronsman ........... A61G 5/1045 5/709
6,370,716 B1 4/2002 Wilkinson
6,536,056 B1 3/2003 Vrzalik et al.
6,564,411 B2 5/2003 Pirzada
6,668,408 B2 12/2003 Neder et al.
6,671,911 B1 * 1/2004 Hill ...................... A61G 5/1043 5/655.3
6,684,433 B2 2/2004 Giori et al.
6,711,771 B2 3/2004 Cook et al.
6,721,979 B1 4/2004 Vrzalik et al.
6,789,284 B2 9/2004 Kemp
6,813,790 B2 11/2004 Flick et al.
6,826,795 B2 12/2004 Wilkinson
6,868,569 B2 * 3/2005 VanSteenburg ...... A47C 27/081 5/709
6,877,178 B2 4/2005 Chapman et al.
6,892,405 B1 5/2005 Dimitriu et al.
6,907,633 B2 6/2005 Paolini et al.
6,928,681 B1 8/2005 Stacy
7,007,330 B2 3/2006 Kuiper et al.
7,226,471 B2 6/2007 Heaton et al.
7,260,860 B2 8/2007 Chambers et al.
7,444,704 B2 11/2008 Phillips et al.
7,604,606 B2 * 10/2009 Dehli ................... A61H 9/0078 128/DIG. 13
7,784,130 B2 8/2010 Pile
7,784,132 B2 8/2010 Gonzalez et al.
8,533,879 B1 * 9/2013 Taylor .................. A61B 5/1126 5/713
RE44,584 E 11/2013 Wilkinson
8,615,831 B2 * 12/2013 Lipman .................. A47C 27/10 5/710
8,756,737 B2 * 6/2014 Chan ...................... A47C 27/10 5/715
8,832,886 B2 * 9/2014 Riley ................... A47C 27/083 5/713
9,021,640 B2 * 5/2015 Mohr ................ A61G 7/05753 5/740
9,655,456 B2 * 5/2017 Boyd ................... A47C 27/088
10,034,808 B2 7/2018 Vrzalik et al.
11,737,577 B1 8/2023 Liu
2002/0129448 A1 * 9/2002 Pirzada .................. A47C 27/18 5/713
2004/0031103 A1 * 2/2004 Wyatt .................. A47C 27/088 5/710
2004/0237203 A1 * 12/2004 Romano ............ A61G 7/05776 5/713
2005/0044634 A1 3/2005 Wang
2006/0085919 A1 4/2006 Kramer et al.
2007/0107133 A1 5/2007 Schwaiger et al.
2007/0113351 A1 5/2007 Reger et al.
2007/0186349 A1 8/2007 Lipman et al.
2007/0199154 A1 8/2007 Escaross
2007/0234481 A1 10/2007 Totton et al.
2007/0266499 A1 11/2007 O'Keefe et al.
2007/0277325 A1 12/2007 Bertram et al.
2007/0283496 A1 12/2007 Skripps
2008/0028532 A1 * 2/2008 Rogers ............... A61G 7/05769 5/706
2010/0175196 A1 7/2010 Lafleche et al.
2011/0197366 A1 * 8/2011 Lachenbruch ..... A61G 7/05776 5/655.3
2011/0209287 A1 * 9/2011 Call .................. A61G 7/05769 5/658
2012/0304391 A1 * 12/2012 Driscoll, Jr. .......... F04D 17/161 5/710
2014/0026325 A1 * 1/2014 Guthrie ................ A47C 27/088 5/709
2014/0101861 A1 * 4/2014 Gowda ................ A47C 27/088 5/709
2014/0208519 A1 * 7/2014 Balonick ............. A47C 27/083 5/709
2014/0331412 A1 * 11/2014 Taylor ....................... G01L 1/18 5/691
2015/0026895 A1 * 1/2015 Geelen ................. A47C 27/088 5/699
2015/0320230 A1 * 11/2015 Creekmuir ........... A47C 27/081 5/709
2016/0067128 A1 * 3/2016 Wilkinson ............ A47C 27/10 5/709
2016/0128490 A1 * 5/2016 Cheng ...................... A47C 4/54 5/655.3
2016/0184155 A1 * 6/2016 Streeter .............. A61G 7/05769 700/282
2018/0256383 A1 * 9/2018 Booth ................ A61G 7/05776
2018/0325761 A1 * 11/2018 Shih ....................... A47C 27/10
2019/0151175 A1 5/2019 Kelch et al.
2019/0174930 A1 * 6/2019 DeFranks ............ A47C 21/006
2020/0323355 A1 * 10/2020 Jacot .................... A47C 27/088
2021/0177680 A1 * 6/2021 Poulos ............... A61G 7/05769
2021/0227991 A1 * 7/2021 Frank ................... A47C 27/083

FOREIGN PATENT DOCUMENTS

CN 102657457 A 9/2012
CN 209528608 U 10/2019
DE 4324508 A1 1/1995
DE 102015012579 A1 5/2016
DE 102016004685 A1 11/2016
EP 0878150 A2 11/1998
EP 1815830 A1 8/2007
EP 2535029 B1 11/2016
EP 3107514 B1 9/2020
ES 2019404 B3 6/1991
FR 2953387 A1 6/2011
GB 959103 A 5/1964
GB 2392088 A 2/2004

(56) References Cited

FOREIGN PATENT DOCUMENTS

| | | | |
|---|---|---|---|
| KR | 20180070424 | A | 6/2018 |
| SE | 1850067 | A1 | 7/2019 |
| TW | 200701972 | A | 1/2007 |
| WO | 9535055 | A1 | 12/1995 |

* cited by examiner

MATTRESS SYSTEM

FIELD OF THE DISCLOSURE

The present disclosure generally relates to a hybrid mattress system for a patient support apparatus.

SUMMARY OF THE DISCLOSURE

According to one aspect of the present disclosure, a patient support apparatus includes a mattress that defines a plurality of grooves. A bladder is disposed within each groove. Each bladder is operable between a deployed state and a non-deployed state. A flap is disposed adjacent to each groove. Each flap includes a broad contact surface and a narrow contact surface. A manifold is in fluid communication with each bladder. The manifold is configured to direct fluid into each bladder to adjust the bladders between the deployed state and the non-deployed state, and consequently move the flaps between a raised position and a lowered position, respectively.

According to another aspect of the present disclosure, a mattress system for a patient support apparatus includes a mattress that defines a groove. The mattress includes a base surface. A bladder is disposed within the groove. The bladder is operable between a deployed state and a non-deployed state. A flap is disposed adjacent to the groove. The flap is operable between a raised position and a lowered position. A manifold is configured to adjust the bladder between the deployed state and the non-deployed state. The flap rotates away from the base surface as the bladder is adjusted from the non-deployed state to the deployed state.

According to yet another aspect of the present disclosure, a mattress system for a patient support apparatus includes a mattress that has a support surface. The mattress defines a cavity therein. A first bladder is disposed within the cavity. A second bladder is disposed within the cavity proximate the first bladder. Each of the first bladder and the second bladder are operable between an expanded state, a compressed state, and a neutral state. A pump is in fluid communication with each of the first bladder and the second bladder. The pump defines a first port and a second port. A manifold is in fluid communication with the first bladder, the second bladder, and the pump. The pump is configured to evacuate fluid from the first bladder when the manifold is in a first operating state and configured to evacuate fluid from the second bladder when the manifold is in a second operating state to influence a shape of the support surface of the mattress.

These and other features, advantages, and objects of the present disclosure will be further understood and appreciated by those skilled in the art by reference to the following specification, claims, and appended drawings.

DETAILED DESCRIPTION

Figure 1:
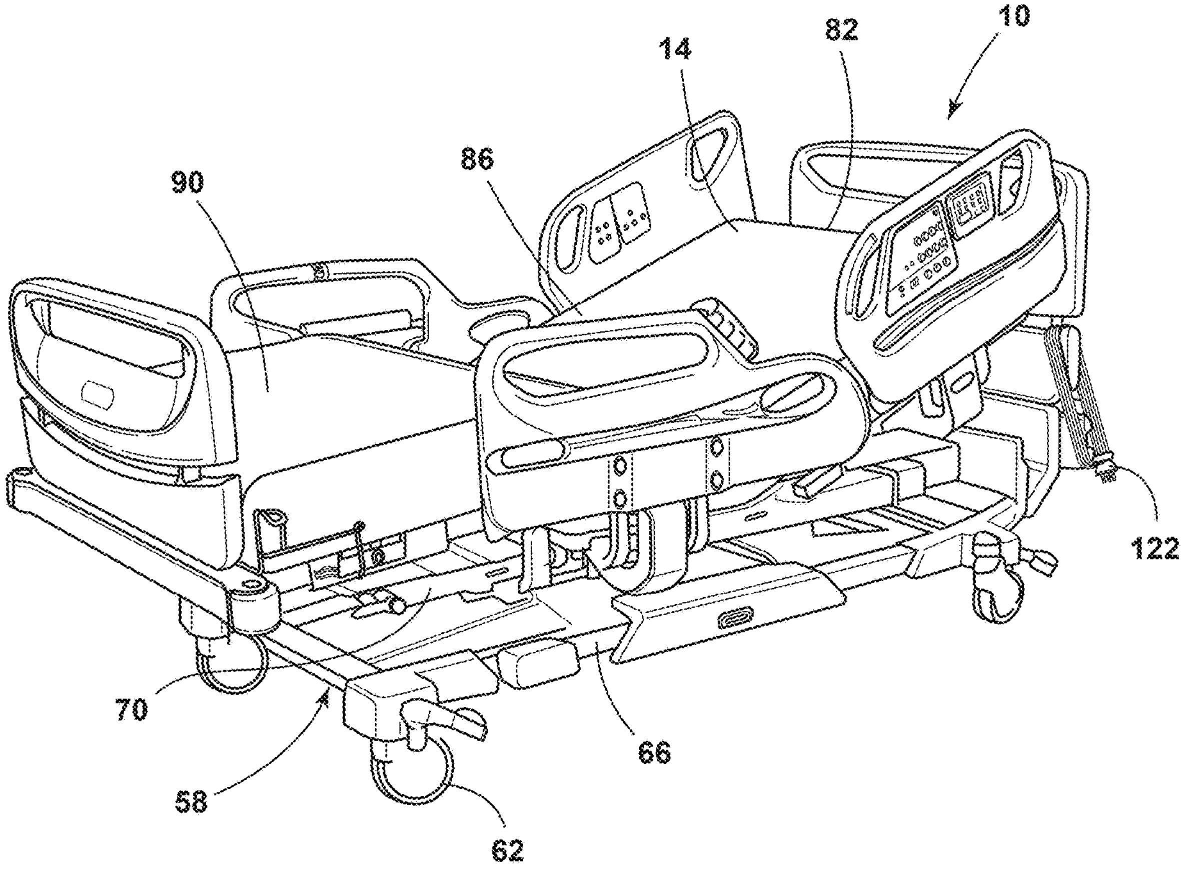
FIG. 1 is a side perspective view of a patient support apparatus, according to the present disclosure.

The present illustrated embodiments reside primarily in combinations of method steps and apparatus components related to a hybrid mattress system for a patient support apparatus. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface closest to an intended viewer, and the term "rear" shall refer to a surface furthest from the intended viewer. However, it is to be understood that the disclosure may assume various alternative orientations, except where expressly specified to the contrary. It is also to be understood that the specific structures and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-14, reference numeral 10 generally designates a patient support apparatus that includes a mattress 14 that defines a plurality of grooves 18. A bladder 22 is disposed within each groove 18. Each bladder 22 is operable between a deployed state 26 and a non-deployed state 30. A flap 34 is disposed adjacent to each groove 18. Each flap 34 includes a broad contact surface 38 and a narrow contact surface 42. A manifold 46 is in fluid communication with each bladder 22. The manifold 46 is configured to direct fluid into each bladder 22 to adjust the bladders 22 between the deployed state 26 and the non-deployed state 30, and consequently, move the flaps 34 between a raised position 50 and a lowered position 54.

With reference to FIG. 1, the illustrated patient support apparatus 10 is configured as a hospital bed or another medical bed. The patient support apparatus 10 includes a frame 58 supported on casters or wheels 62 that engage an underlying floor surface. The wheels 62 may be configured to rotate in a power drive mode in order to propel the patient support apparatus 10 for transportation by a caregiver, a medical professional, or another user.

The frame 58 includes a base frame 66 that supports an upper frame 70. The upper frame 70 of the patient support apparatus 10 may be operable between raised, lowered, and/or tilted positions relative to the base frame 66. A support member, such as the mattress 14, is disposed on the upper frame 70. It is within the scope of this disclosure that the patient support apparatus 10 may be any patient support apparatus known in the art, such as, for example, a stretcher, a medical bed, a bed frame, a mattress, other types of beds, surgical tables, examination tables, or any suitable structure for supporting a patient or occupant.

Figure 2:
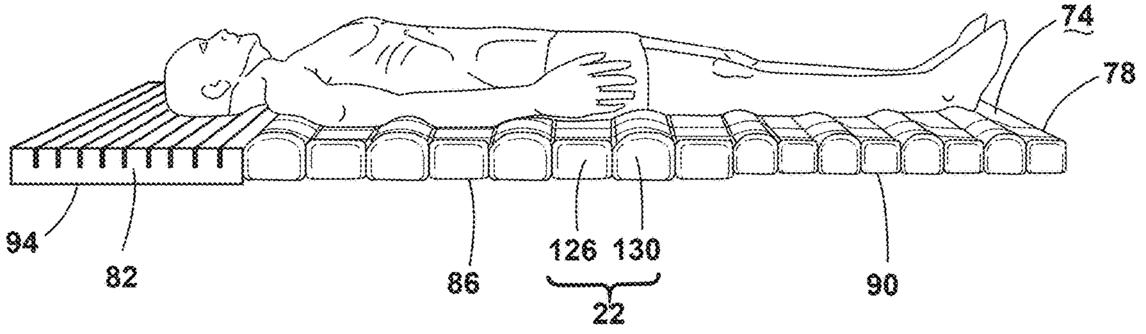
FIG. 2 is a side perspective view of bladders within a mattress for a patient support apparatus, according to the present disclosure.

Referring to FIGS. 1 and 2, the mattress 14 includes a support surface 74 for supporting the patient or the occupant thereon. The mattress 14 may define a cavity 78. The bladders 22 are disposed within the cavity 78 of the mattress 14. The mattress 14 may be divided into more than one region, such as, for example, a head region 82, a torso region 86, and a leg region 90. The bladders 22 may be disposed within the cavity 78 in the torso region 86 and the leg region 90, with the head region 82 being free of bladders 22. The head region 82 can be filled with a separate support structure 94 that provides comfort and supports to the head of the patient.

The bladders 22 may be elongated bladders 22 extending from a first side to a second side of the mattress 14. Alternatively, one or more bladders 22 may be disposed adjacent to one another from the first side to the second side. The bladders 22 are disposed within the cavity 78 between the support structure 94 and an end of the mattress 14 in the leg region 90. As illustrated in FIG. 2, the bladders 22 are disposed adjacent to and in contact with one another to reduce or minimize gaps between adjacent bladders 22.

Figure 3:
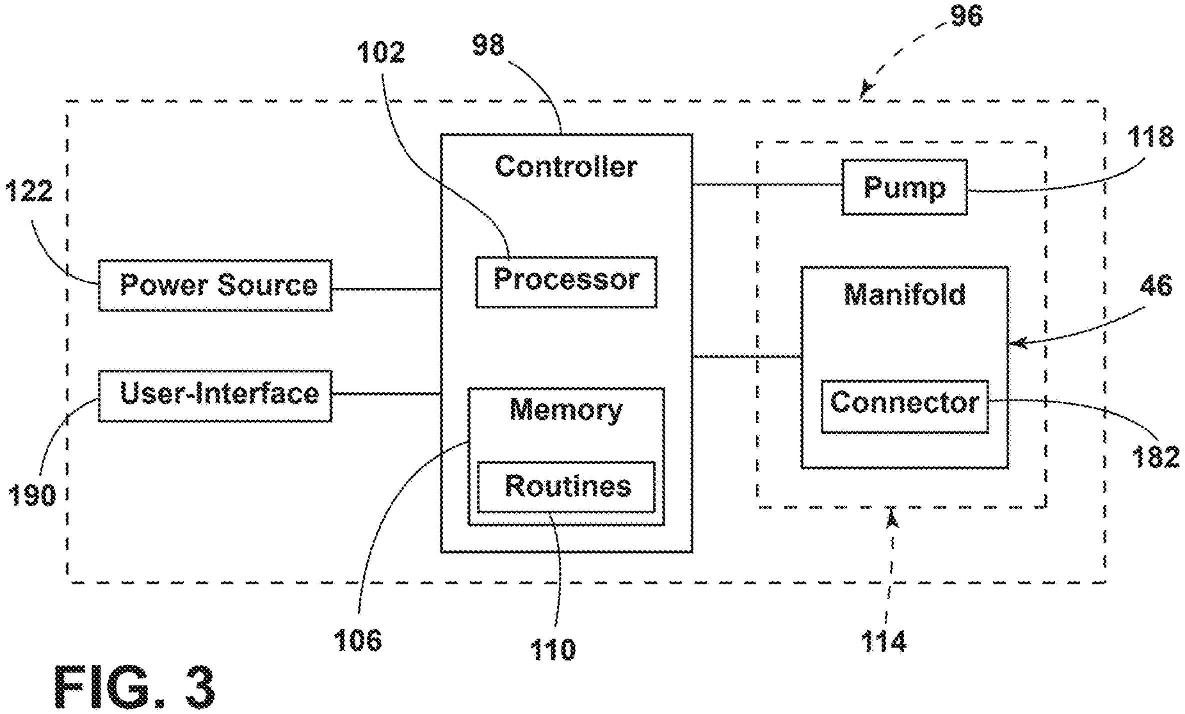
FIG. 3 is a block diagram of a patient support apparatus, according to the present disclosure.

Referring to FIGS. 2 and 3, a mattress system 96 for the patient support apparatus 10 includes a controller 98 that has a processor 102, a memory 106, and other control circuitry. Instructions or routines 110 are stored within the memory 106 and executable by the processor 102. The patient support apparatus 10 includes a manifold system 114 that includes the manifold 46 and a pump 118. At least one routine 110 can relate to the operation of the pump 118, which adjusts the fluid within the bladders 22.

The patient support apparatus 10 may include a power source 122 disposed within and/or coupled to the frame 58 (FIG. 1) or elsewhere on the patient support apparatus 10. Alternatively, the power source 122 may be an external power source, such as, for example, power supplied through an outlet within a hospital or another medical facility. The mattress 14 is configured to operate in a non-powered condition and a powered condition. In the non-powered condition, the mattress is configured to provide comfort for the patient or occupant disposed thereon. In the powered condition, the mattress 14 is configured to provide alternating low pressure therapy or other changes in the pressure across the mattress 14 to provide medical benefits to the patient disposed thereon. In the powered condition, the bladders 22 influence the shape of the support surface 74 to provide a local discharge of pressure between the patient and the mattress 14.

Figure 4:
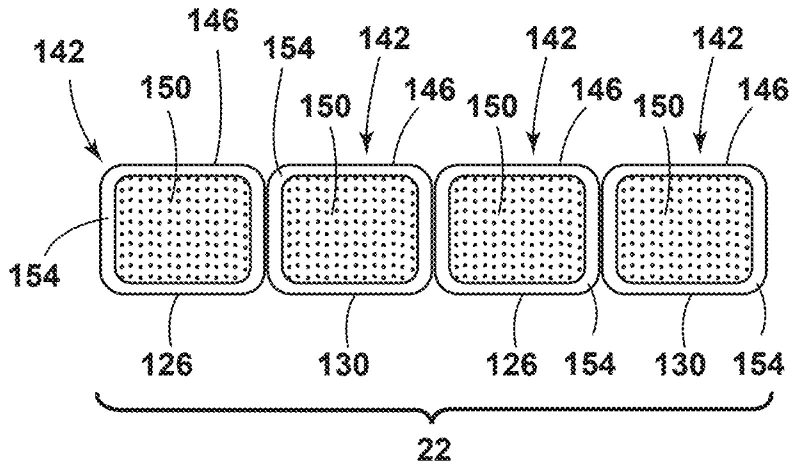
FIG. 4 is a schematic view of bladders in fluid communication with a pump via a manifold, according to the present disclosure.

Referring to FIG. 4, the bladders 22 are disposed abutting one another in the cavity 78 to support the patient disposed on the mattress 14. When the mattress 14 is in the non-powered condition, the bladders 22 provide a comfort for the patient. The mattress 14 includes a first bladder 126 and a second bladder 130 disposed proximate one another in the cavity 78. Each of the first and second bladders 126, 130 includes an outer membrane 146 and a core 150 disposed within the outer membrane 146. When the mattress 14 is in the non-powered condition, the first and second bladders 126, 130 are in a neutral state 142 defined by the core 150. When the first and second bladders 126, 130 are in the neutral state 142, the size and shape of the cores 150 define the size and shape of the respective first and second bladders 126, 130. Upper surfaces of the first and second bladders 126, 130 are generally co-planar when in the neutral state 142 to provide a generally planar support surface 74 of the mattress 14. The upper surfaces may not be completely planar, but may form a generally flat or planar surface. The upper surfaces are generally aligned, but it is contemplated that the upper surfaces may be minimally offset from one another. The upper surfaces may have some degree of curvature or deformation caused by the shape of the first and second bladders 126, 130, the patient disposed on the mattress 14, or other features of the mattress system 96.

Figure 5:
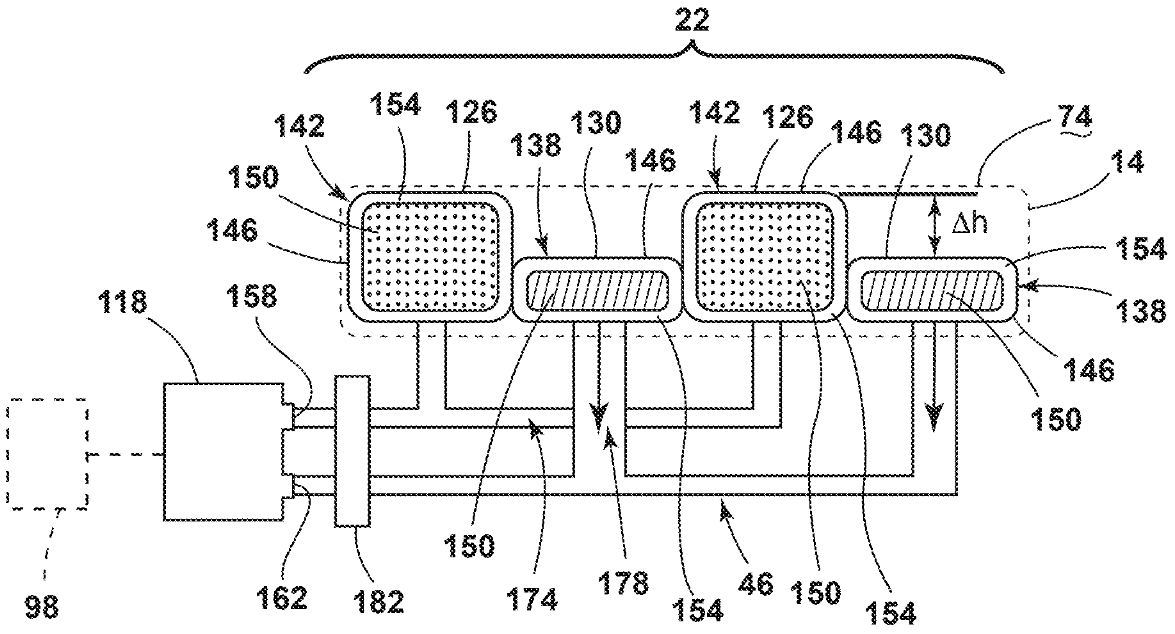
FIG. 5 is a schematic view of bladders in fluid communication with a pump via a manifold, according to the present disclosure.
Figure 6:
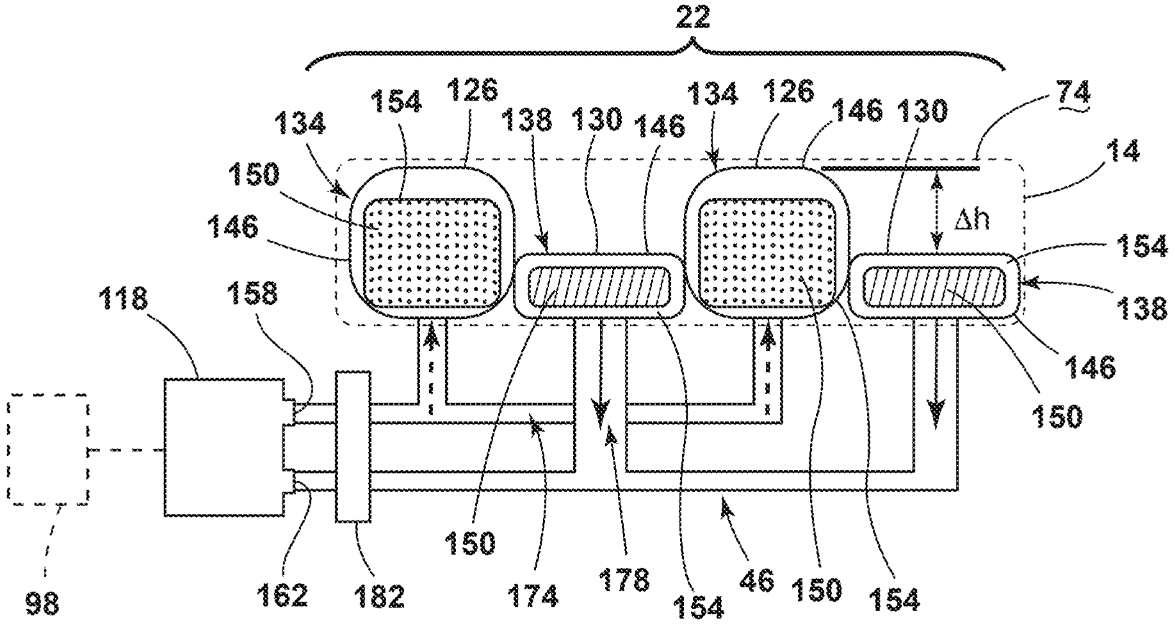
FIG. 6 is a schematic view of bladders in fluid communication with a pump via a manifold, according to the present disclosure.

Referring to FIGS. 4-6, the first bladder 126 and the second bladder 130 are configured to be adjusted independently of one another when the mattress 14 is in the powered condition. The first and second bladders 126, 130 are each operable between an expanded state 134, a compressed state 138, and the neutral state 142. Each of the first and second bladders 126, 130 defines a chamber 154 within the outer membrane 146. The chamber 154 provides space for the core 150, as well as, fluid directed into the outer membrane 146. The outer membrane 146 is impermeable to prevent the fluid within the first and second bladders 126, 130 from escaping the respective chamber 154. The core 150 is formed of a porous material that is elastically deformable, such as, for example, a foam material or other similar material. The core 150 of each of the first and second bladders 126, 130 is configured to compress and expand as the respective first or second bladder 126, 130 is adjusted between the expanded state 134, the compressed state 138, and the neutral state 142.

The size and shape of the first and second bladders 126, 130 can be adjusted from the neutral state 142 by the controller 98 via the pump 118. The pump 118 is in fluid communication with the first and second bladders 126, 130 via the manifold 46. The pump 118 includes a first port 158 and a second port 162. In a non-limiting example, the first port 158 is configured as an outlet directing fluid away from the pump 118, and the second port 162 is configured as an inlet directing fluid into the pump 118.

As illustrated in FIG. 5, when the mattress 14 is in the powered condition, the pump 118 is configured to evacuate fluid from one of the first and second bladders 126, 130. The shape and size of the second bladder 130 is adjusted while the first bladder 126 remains in the neutral state 142. The second bladder 130 is in fluid communication with the second port 162. The pump 118 is configured to evacuate the fluid within the second bladder 130, and consequently adjust the second bladder 130 from the neutral state 142 to the compressed state 138. During the evacuation, the fluid is reduced or removed from the chamber 154, and the core 150 is compressed to a decreased height relative to when the core 150 is in the neutral state 142. Accordingly, when the second bladder 130 is in the compressed state 138, a height difference is produced between the second bladder 130 and the first bladder 126. The height difference provides a change in the shape of the support surface 74 of the mattress 14. The change in shape results in low pressure areas where the second bladder 130 is compressed. The low pressure area provides a local discharge of a pressure contact between the patient and the mattress 14 to allow for re-oxygenation of cells and increased blood circulation.

After the evacuation of the fluid from the second bladder 130, the manifold 46 may disrupt the fluid communication between the second bladder 130 and the pump 118. With the disruption, the second bladder 130 returns to the neutral state 142 as the core 150 expands to the original size and shape of the core 150. Similar to the second bladder 130, the first bladder 126 may be in fluid communication with the second port 162 of the pump 118. The first bladder 126 can have the fluid evacuated therefrom to adjust the first bladder 126 from the neutral state 142 to the compressed state 138. The manifold 46 may disrupt the fluid communication between the first bladder 126 and the pump 118, allowing the first bladder 126 to return to the neutral state 142.

The mattress 14 may be configured to provide a cycling pattern between the first and second bladders 126, 130. The first and second bladders 126, 130 may be adjusted to the compressed state 138 at separate times. The second bladder 130 can be adjusted to the compressed state 138 while the first bladder 126 remains in the neutral state 142. In a non-limiting example, the second bladder 130 may return to the neutral state 142 prior to the first bladder 126 being adjusted to the compressed state 138. Alternatively, in another non-limiting example, as the second bladder 130 is adjusting to the neutral state 142, the first bladder 126 may be adjusted to the compressed state 138. In this way, the first and second bladders 126, 130 can be adjusted in opposing patterns, such that one of the first and second bladders 126, 130 is compressed while the other remains in the neutral state 142.

Referring to FIG. 6, in an additional or alternative non-limiting example, one of the first and second bladders 126, 130 can be adjusted to the compressed state 138 and the other of the first and second bladders 126, 130 can be adjusted to the expanded state 134. The adjustments between the expanded and compressed states 134, 138 may be simultaneous, such that, for example, the first bladder 126 is in the expanded state 134 while the second bladder 130 is in the compressed state 138. Alternatively, each of the first and second bladders 126, 130 may be adjusted at a single time. For example, the first bladder 126 can be adjusted from the expanded state 134 to the neutral state 142 prior to the second bladder 130 being adjusted from the neutral state 142 to the compressed state 138. The expansion of the first bladder 126 in conjunction with the compression of the second bladder 130 provides for a greater height difference between the first and second bladders 126, 130. The increased height difference creates a greater local discharge of the pressure contact between the patient and the mattress 14 to allow for re-oxygenation of cells and increase blood circulation.

To adjust the first bladder 126 to the expanded state 134, the first bladder 126 is in fluid communication with the first port 158 of the pump 118. The pump 118 is configured to direct fluid into the chamber 154 causing the outer membrane 146 to expand. The outer membrane 146 may be formed of an elastic material configured to expand with the increase in fluid, or alternatively, the outer membrane 146 may have a capacity to house the additional fluid in the expanded state 134. To return the first bladder 126 to the neutral state 142, the manifold 46 is configured to disrupt the fluid communication between the first bladder 126 and the pump 118. The fluid can exit the first bladder 126 through the manifold 46 allowing the first bladder 126 to return to the neutral state 142. It is contemplated that the fluid may be any gas and/or liquid material configured to be added to and removed from the first and second bladders 126, 130.

Figure 7:
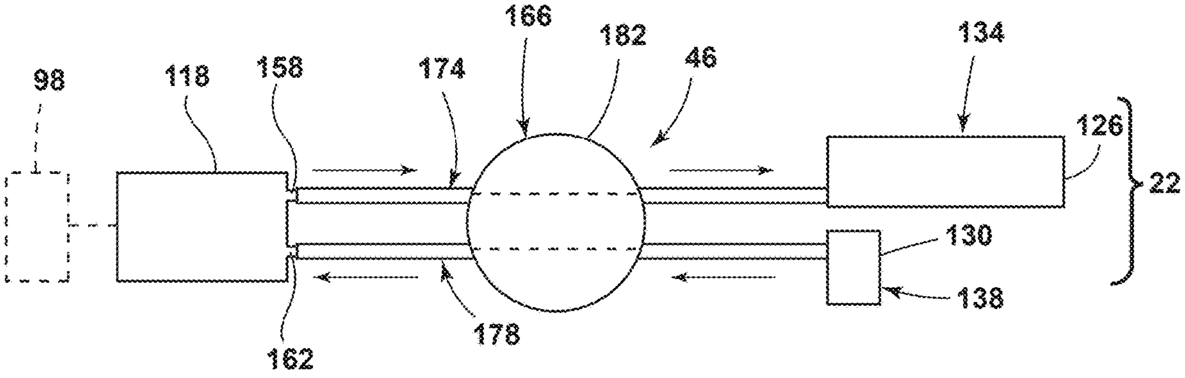
FIG. 7 is a schematic view of a manifold system in fluid communication with bladders, with a manifold in a first operating state, according to the present disclosure.
Figure 8:
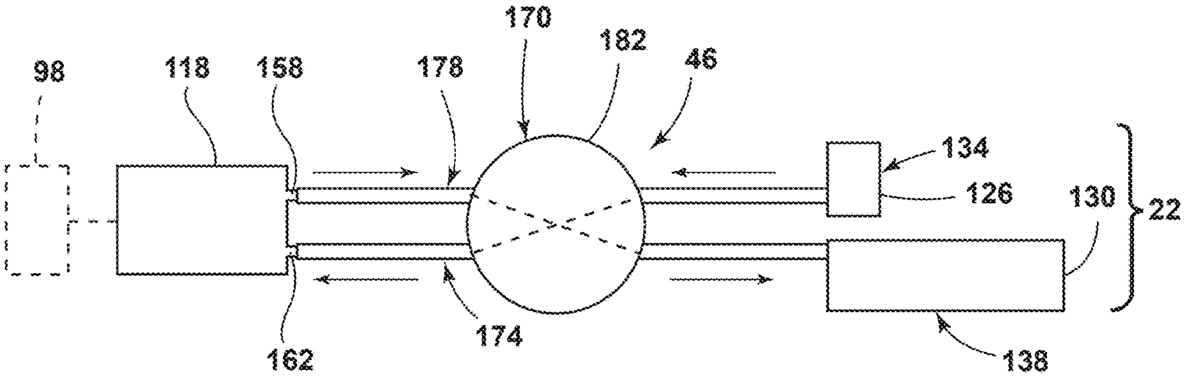
FIG. 8 is a schematic view of the manifold system of FIG. 6, with the manifold in a second operating state, according to the present disclosure.

Referring to FIGS. 7 and 8, each of the first and second bladders 126, 130 can alternate between the expanded state 134 and the compressed state 138 bypassing the neutral state 142 (FIG. 5). The manifold 46 may be operable between a first operating state 166, as illustrated in FIG. 7, and a second operating state 170, as illustrated in FIG. 8. The manifold 46 defines a first fluid path 174 between the pump 118 and the first bladder 126 and a second fluid path 178 between the pump 118 and the second bladder 130. In various examples, the manifold 46 includes a connector 182 configured to adjust the first and second fluid paths 174, 178.

As illustrated in FIG. 7, when the manifold 46 is in the first operating state 166, the first bladder 126 is in fluid communication with the first port 158 and the second bladder 130 is in fluid communication with the second port 162. The pump 118 is configured to direct fluid along the first fluid path 174 into the first bladder 126. Additionally or alternatively, the pump 118 is configured to evacuate fluid from the second bladder 130 along the second fluid path 178. Accordingly, the first bladder 126 is in the expanded state 134, while the second bladder 130 is in the compressed state 138. In this configuration, the first and second fluid paths 174, 178 are substantially parallel to one another through the connector 182.

Referring to FIG. 8, when the manifold 46 is in the second operating state 170, the pump 118 is configured to evacuate fluid from the first bladder 126 and direct fluid into the second bladder 130. This configuration adjusts the first bladder 126 to the compressed state 138 and the second bladder 130 to the expanded state 134. The first bladder 126 is in fluid communication with the second port 162 of the pump 118 and the second bladder 130 is in fluid communication with the first port 158. The connector 182 is configured to adjust the first and second fluid paths 174, 178 to adjust whether the fluid is being evacuated from or directed to the first and second bladders 126, 130.

As illustrated in FIG. 8, the first and second fluid paths 174, 178 are in a crossing configuration within the connector 182. It is contemplated that while the first and second fluid paths 174, 178 are crossing, the first and second fluid paths 174, 178 may be free of an intersecting point to prevent the fluid from being redirected from the designated path. The connector 182 may be configured to flip, rotate, move, or otherwise adjust the position in order to adjust the operating state of the manifold 46, and consequently adjust the first and second fluid paths 174, 178. In operation, the controller 98 may send a signal to the connector 182 causing the connector 182 to adjust, and therefore, adjust the first and second fluid paths 174, 178.

Figure 9:
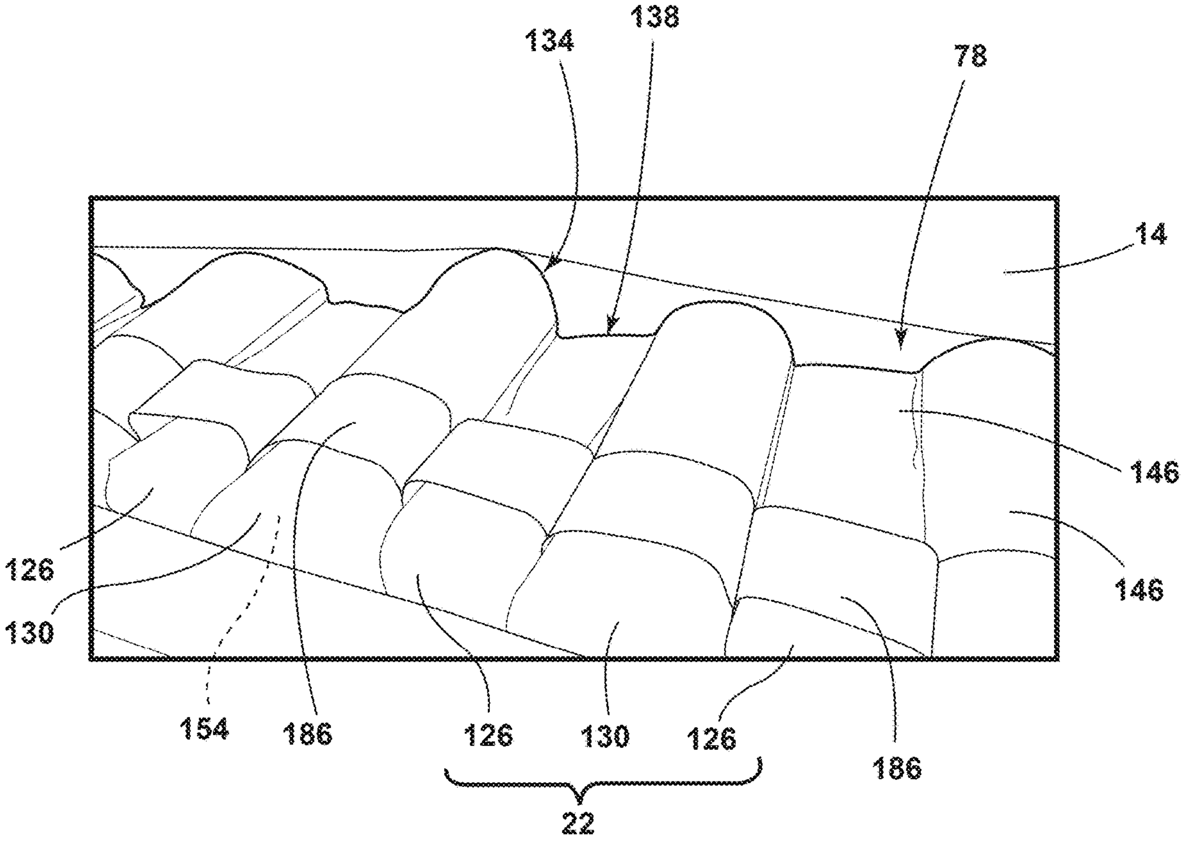
FIG. 9 is a top perspective view of bladders within a mattress with a support surface removed, according to the present disclosure.

Referring to FIG. 9, the first and second bladders 126, 130 are illustrated within the cavity 78 with the support surface 74 (FIG. 1) removed. The first bladder 126 is illustrated in the expanded state 134 and the second bladder 130 is illustrated in the compressed state 138. The adjustment of the first and second bladders 126, 130 influence the shape of the support surface 74 of the mattress 14 when the support surface 74 is disposed over the first and second bladders 126, 130.

A retaining member 186 may be coupled to each of the first and second bladders 126, 130. As illustrated in FIG. 9, the retaining member 186 is a band or strap disposed around the outer membrane 146 of each of the first and second bladders 126, 130. When in the expanded state 134, the retaining member 186 may define the size and shape of the respective first and second bladders 126, 130. Accordingly, the retaining member 186 may provide a limit for the quantity of fluid received within the chamber 154. When in the compressed state 138, the retaining member 186 may be spaced-apart from the outer membrane 146. In the compressed state 138, the respective first and second bladders 126, 130 can be a height less than a height defined by the retaining member 186.

Referring to FIGS. 1-9, a medical professional or other medical personnel can control the mattress 14 via a user-interface 190. The medical personnel can input a command into the user-interface 190, which is then communicated to the controller 98. The user-interface 190 can be disposed on the patient support apparatus 10, or alternatively, may be a remote device in communication or otherwise associated with the controller 98 through a network.

After receiving the signal from the user-interface 190, the controller 98 can send a corresponding signal to the pump 118 and/or the connector 182 to adjust the first and second bladders 126, 130. The first and second bladders 126, 130 can be adjusted to apply a pattern of low pressure zones on the patient disposed on the mattress 14. Each of the first and second bladders 126, 130 within the torso and leg regions 86, 90 may be controlled in a similar manner. The first and second bladders 126, 130 of the torso and leg regions 86, 90 may be operated simultaneously, or alternatively, the first and second bladders 126, 130 of the torso region 86 can be operated independently from the first and second bladders 126, 130 of the leg region 90. The pattern of low pressure applied in the different regions (e.g., the torso region 86 and the leg region 90) can provide comfort to the patient while simultaneously providing therapeutic benefits to the selected region.

Referring to FIGS. 10-14, an additional or alternative configuration of the mattress 14 is illustrated. The mattress 14 includes a base surface 194 configured to be disposed on the patient support apparatus 10 (FIG. 1). The mattress 14 defines a plurality of grooves 18 on an opposite surface relative to the base surface 194. The grooves 18 extend transversely across the mattress 14. In a non-limiting example, the grooves 18 extend across the width of the mattress 14 between the first and second sides. The depth and configuration of each groove 18 may depend on the selected configuration of the mattress 14 and the intended use of the mattress 14 (e.g., specific cycling patterns).

The mattress 14 may be formed of an elastically compressible and/or deformable material, such as, for example, a foam material. The mattress 14 can be operated in the non-powered condition and the powered condition. The powered condition provides for the alternating low pressure therapy for the patient utilizing the flap 34. The flap 34 is disposed adjacent to each groove 18. Each flap 34 includes the broad contact surface 38 and the narrow contact surface 42. Each flap 34 is operable between the raised position 50 and the lowered position 54. When the mattress 14 is in the non-powered condition, each flap 34 is disposed in the lowered position 54. When the flaps 34 are in the lowered position 54, the broad contact surface 38 is configured to contact the patient or occupant disposed on the mattress 14 and the mattress 14 defines a uniform support surface 74. The broad contact surface 38 of each flap 34 includes a planar extent. The planar extent of adjacent flaps 34 are generally co-planar when the adjacent flaps 34 are in the lowered position 54. This configuration of the support surface 74 is configured to provide greater comfort for the patient or occupant on the mattress 14. It is understood that the planar extent of each flap 34 may not be completely planar, and that the planar extent of each flap 34 may not be completely aligned. Each flap 34 forms a generally flat or planar surface. The flaps 34 are generally aligned when in the lowered position 54, but it is contemplated that the planar extent of each flap 34 may be minimally offset from one another. The planar extent, and therefore each broad contact surface 38, may have some degree of curvature or deformation caused by the shape of the first and second bladders 126, 130, the patient disposed on the mattress 14, or other features of the mattress system 96.

When the mattress 14 is in the powered condition, at least one flap 34 is configured to be adjusted to the raised position 50. When the flaps 34 are in the raised position 50, the narrow contact surface 42 is configured to contact the patient or occupant disposed thereon. When at least one of the flaps 34 is in the raised position 50, the mattress 14 defines an irregular support surface 74. The broad contact surface 38 of each flap 34 includes the planar extent. The planar extent of adjacent flaps 34 are generally parallel when the adjacent flaps 34 are both in the raised position 50. The irregular support surface 74 is configured to provide a greater local discharge of pressure contact areas between the mattress 14 and the occupant to allow for re-oxygenation of cells and increase blood circulation. It is understood that the planar extent of each flap 34 may not be completely planar, and that the planar extent of each flap 34 may not be completely aligned in a parallel configuration. Each flap 34 forms a generally flat or planar surface. The flaps 34 are generally aligned in a parallel configuration when in the raised position 50, but it is contemplated that the planar extent of each flap 34 may be minimally offset from one another. The general parallel configuration may be minimally offset, which can result from the curvature or deformation of the flaps 34, the shape of the first and second bladders 126, 130, the patient disposed on the mattress 14, or other features of the mattress system 96.

Each flap 34 can have a single connection point with the mattress 14. Each flap 34 includes a proximal end 198 and a distal end 202. The single connection point is the proximal end 198 if each flap 34. Each flap 34 may taper from the proximal end 198 to the distal end 202. The broad contact surface 38 extends between the distal end 202 and the proximal end 198. The narrow contact surface 42 is disposed on the distal end 202 of the flaps 34. The distal end 202 of the flap 34 is configured to rotate away from the base surface 194 when the flap 34 is adjusted from the lowered position 54 to the raised position 50. The distal end 202 is spaced-apart from the respective first or second bladder 126, 130 when the flap 34 is in the raised position 50. The configuration of the flaps 34 may depend on the configuration of the adjacent groove 18.

Figure 10:
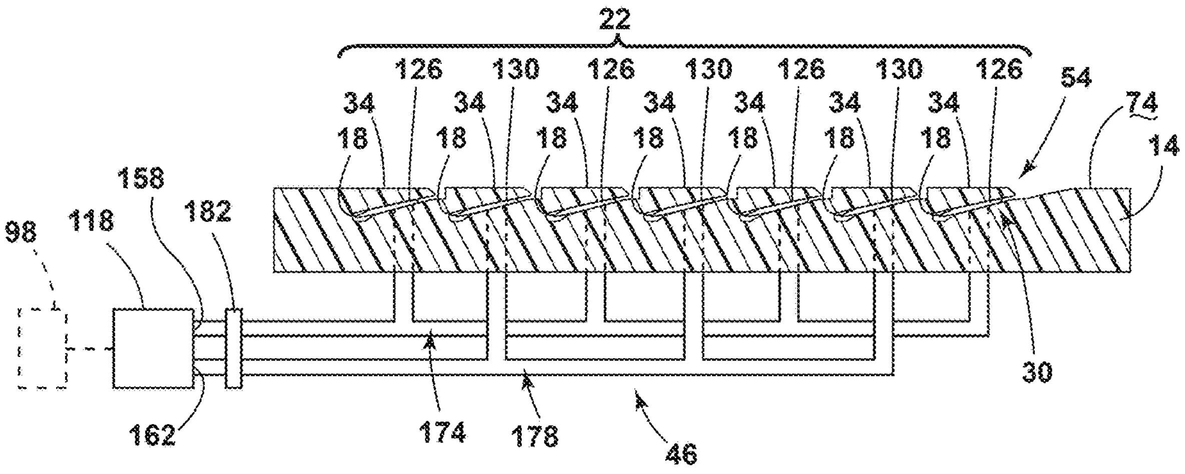
FIG. 10 is a schematic view of a mattress defining grooves with bladders disposed in each groove, according to the present disclosure.
Figure 11:
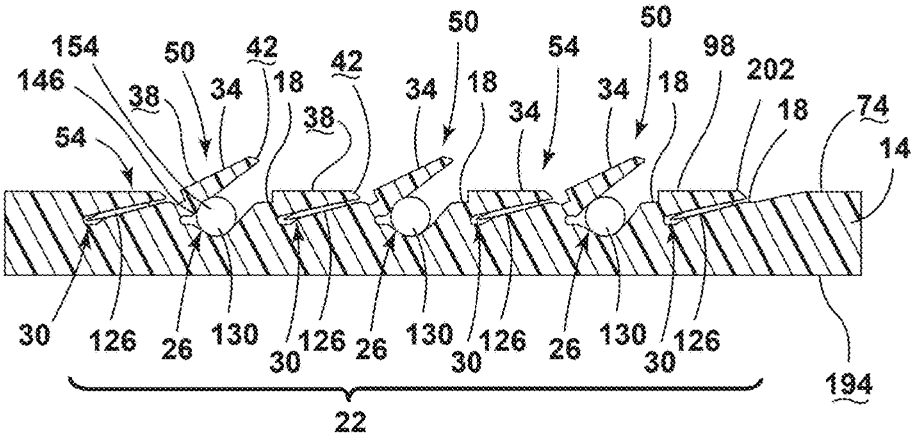
FIG. 11 is a schematic view of the mattress of FIG. 9, with a first bladder in a non-deployed state and a second bladder in a deployed state, according to the present disclosure.

Referring to FIGS. 10 and 11, a bladder 22 is disposed within each of the grooves 18 defined by the mattress 14. Each bladder 22 is operable between the deployed state 26 and the non-deployed state 30. When the bladders 22 are in the non-deployed state 30, the flaps 34 are disposed over the bladders 22 in the lowered position 54. As the bladders 22 are adjusted to the deployed state 26, the bladders 22 cause the flaps 34 to rotate to the raised position 50. The raised position 50 is defined by the size and shape of the bladders 22 disposed in the grooves 18 adjacent to each flap 34. As the bladders 22 are adjusted to the deployed state 26, each groove 18 widens to accommodate the increased size of the respective bladder 22. The grooves 18 are then in fluid communication with an area external to the mattress 14. When in the deployed state 26, the bladders 22 may at least partially extend out of the groove 18. The mattress 14 defines the irregular support surface 74 as the flaps 34 are in the raised position 50, with the planar extent of each flap 34 in the raised position 50 being generally parallel. When the bladders 22 are in the non-deployed state 30, the flaps 34 are in the lowered position 54, and the mattress 14 defines the uniform support surface 74, with the planar extent of each flap 34 in the lowered position 54 being generally co-planar. When some flaps 34 are rotated to the raised position 50, the planar extent of each flap in the raised position 50 are generally parallel and the planar extent of each flap 34 remaining in the lowered position 54 are general co-planar.

Each bladder 22 may be free of mechanical connection to the mattress 14. The bladders 22 may be disposed within the groove 18 and may be retained in the groove 18 by the flaps 34. Additionally or alternatively, the bladders 22 may not be enclosed within the mattress 14. Each bladder 22 includes the outer membrane 146. The bladders 22 include the chamber 154, which is substantially hollow, such that each bladder 22 may be free of the core 150 (FIG. 5). With hollow bladders 22, the non-deployed state 30 can be achieved without the use of the pump 118. When the bladders 22 are in the non-deployed state 30, the bladders 22 may be substantially, or entirely, covered by the flaps 34. Additionally, when in the non-deployed state 30, the bladders 22 may be entirely disposed within the grooves 18.

Referring still to FIGS. 10 and 11, each bladder 22 may be in fluid communication with the pump 118 via the manifold 46. The pump 118 is configured to direct fluid through the manifold 46 into each of the bladders 22. The mattress 14 can include the first bladder 126 and the second bladder 130. The first and second bladders 126, 130 are disposed in adjacent grooves 18. The manifold 46 defines the first fluid path 174 between the first bladder 126 and the pump 118 and the second fluid path 178 between the second bladder 130 and the pump 118. In various examples, the pump 118 may include the first port 158 and the second port 162, where both the first and second ports 158, 162 are configured as outlets to direct fluid into the respective first and second bladders 126, 130. It is contemplated that the pump 118 has a single outlet, and the connector 182 is in fluid communication with both the first and second bladders 126, 130 and the pump 118. In such configurations, the connector 182 can adjust the first and second fluid paths 174, 178 to adjust the fluid communication between the pump 118 and the first and second bladders 126, 130. Alternatively still, it is contemplated that more than one pump 118 can be included in the mattress 14.

In examples including the connector 182, the connector 182 can regulate the first and second fluid paths 174, 178 to selectively adjust one of the first and second bladders 126, 130 from the non-deployed state 30 to the deployed state 26. The manifold 46 is configured to disrupt the fluid communication between each of the first and second bladders 126, 130 and the pump 118. When the fluid communication is disrupted, each of the first and second bladders 126, 130 are configured to return to the non-deployed state 30. It is contemplated that the fluid may be any gas, liquid, or semi-liquid. In various examples, the fluid is air directed into the first and second bladders 126, 130. In such examples, the non-deployed state 30 is a deflated condition and the deployed state 26 is an inflated condition.

Referring to FIGS. 10 and 11, the first and second bladders 126, 130 can be in different states at the same time. For example, the first bladder 126 can be in the non-deployed state 30 while the second bladder 130 is in the deployed state 26. Accordingly, each flap 34 disposed adjacent to the groove 18 having the first bladder 126 is in the lowered position 54. Each flap 34 disposed adjacent to a groove 18 having the second bladder 130 is in the raised position 50. In such configurations, the controller 98 may send a signal to the pump 118 to direct fluid into the second bladder 130 via the second fluid path 178 of the manifold 46. The narrow contact surface 42 of the flaps 34 adjacent to the second bladder 130 can be rotated away from the base surface 194 to contact the patient or occupant. The flaps 34 in the raised position 50 are configured to create low pressure regions, which improves re-oxygenation of cells and increases blood circulation of the patient Referring to FIGS. 10 and 12, the first bladder 126 can be in fluid communication with the pump 118. In such configurations, the flaps 34 adjacent to the first bladder 126 rotate to the raised position 50 as the pump 118 directs fluid into the first bladder 126. The first bladder 126 is adjusted from the non-deployed state 30 to the deployed state 26, which consequently rotates the adjacent flaps 34. The flaps 34 adjacent to the second bladder 130 remain in the lowered position 54 as the second bladder 130 remains in the non-deployed state 30. The first and second bladders 126, 130 can be selectively adjusted to the non-deployed state 30 and rotate the corresponding adjacent flaps 34.

Figure 12:
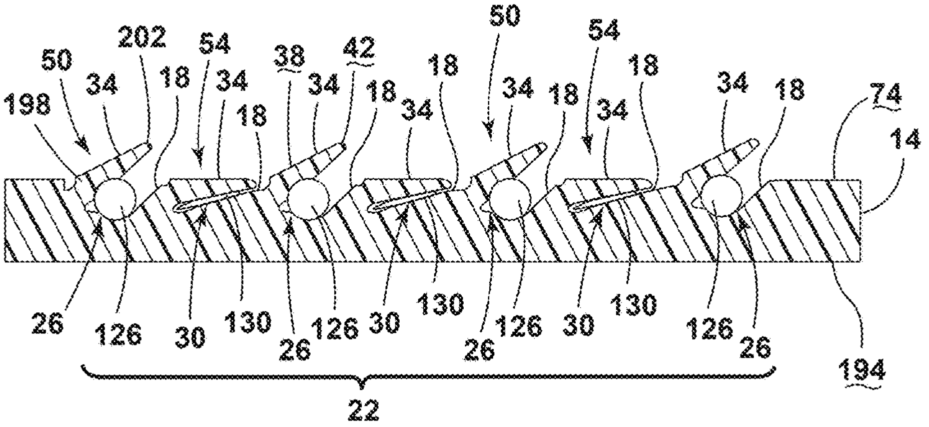
FIG. 12 is a schematic view of the mattress of FIG. 9, with the first bladder in the deployed state and the second bladder in non-deployed state, according to the present disclosure.

Referring to FIGS. 10-12, the first bladder 126 can be adjusted to the deployed state 26 as the second bladder 130 remains in the non-deployed state 30. The manifold 46 can disrupt the fluid communication between the first bladder 126 and the pump 118, thereby causing the first bladder 126 to be adjusted to the non-deployed state 30. In a non-limiting example, the second bladder 130 can be adjusted to the deployed state 26 as the first bladder 126 is being adjusted to the non-deployed state 30. Alternatively, in another non-limiting example, the second bladder 130 can be adjusted to the deployed state 26 after the first bladder 126 has returned to the non-deployed state 30. The connector 182 and/or the manifold 46 can selectively adjust the fluid communication between the pump 118 and each of the first bladder 126 the second bladder 130. Accordingly, the flaps 34 adjacent to the first bladder 126 are in the lowered position 54 when the flaps 34 adjacent to the second bladder 130 are in the raised position 50. The adjustment between the raised and lowered positions 50, 54 provides a changing pattern that massages the patient disposed on the mattress 14 and provides for the low pressure regions.

Referring to FIGS. 3 and 10-12, the medical personnel can input a command in the user-interface 190 to control the pump 118. For example, the medical personnel can input commands to adjust the first and second bladders 126, 130 in one or both of the torso region 86 and the leg region 90 (FIG. 2). The medical personnel can adjust or stop the operation of the manifold system 114, such as, for example, adjusting the pattern and/or timing of the first and second bladders 126, 130.

Figure 13:
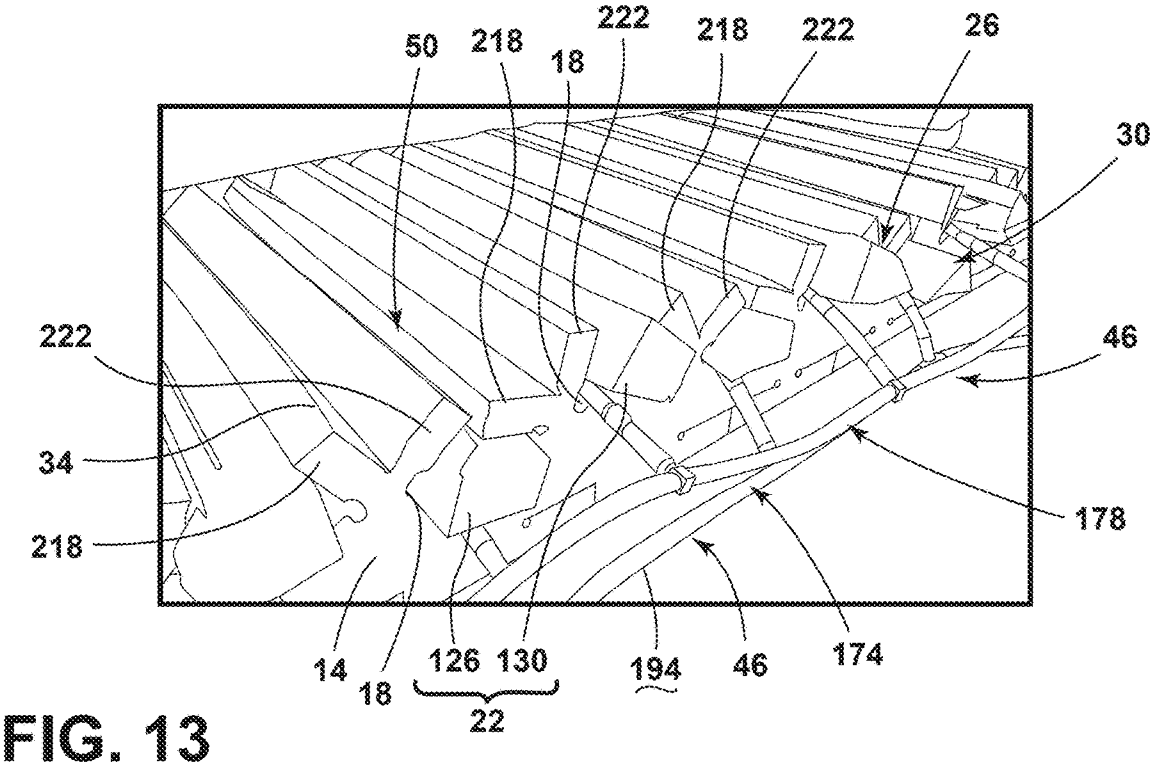
FIG. 13 is a top perspective view of a mattress defining grooves with a bladder disposed in each groove, according to the present disclosure.

Referring to FIG. 13, an additional or alternative configuration of the mattress 14 is illustrated. The mattress 14 may be configured as a foam layer disposed within an outer casing. The outer casing may be a flexible layer that houses the mattress 14, or alternatively, may be a mattress topper layer disposed over the mattress 14. The flaps 34 rotate away from the base surface 194 and against the outer casing providing the irregular support surface 74 (FIG. 1).

As illustrated in FIG. 13, the flaps 34 each include a first projection 218 and a second projection 222 extending in opposing directions. The bladders 22 are disposed within the grooves 18 formed by the first projection 218 of one flap 34 and the second projection 222 of an adjacent flap 34. Accordingly, the flaps 34 have a substantially T-shaped configuration with the bladders 22 disposed between adjacent T-shaped flaps 34. When the bladders 22 are in the non-deployed state 30, the adjacent flaps 34 form a uniform support surface 74 (FIG. 1). The first and second projections 218, 222 form a substantially planar surface to support the patient. When the bladders 22 are in the deployed state 26, the bladders 22 operate to rotate the first and second projections 218, 222 away from the base surface 194. The first projection 218 of one flap 34 and the second projection 222 of the adjacent flap 34 may remain in contact with one another when in the raised position 50 as the bladder 22 disposed between the adjacent flaps 34 is adjusted to the deployed state 26. Alternatively, the first projection 218 and the second projection 222 of adjacent flaps 34 may define a gap therebetween caused by the deployed state 26 of the bladder 22. The groove 18 is in fluid communication with an area external to the mattress 14.

Figure 14:
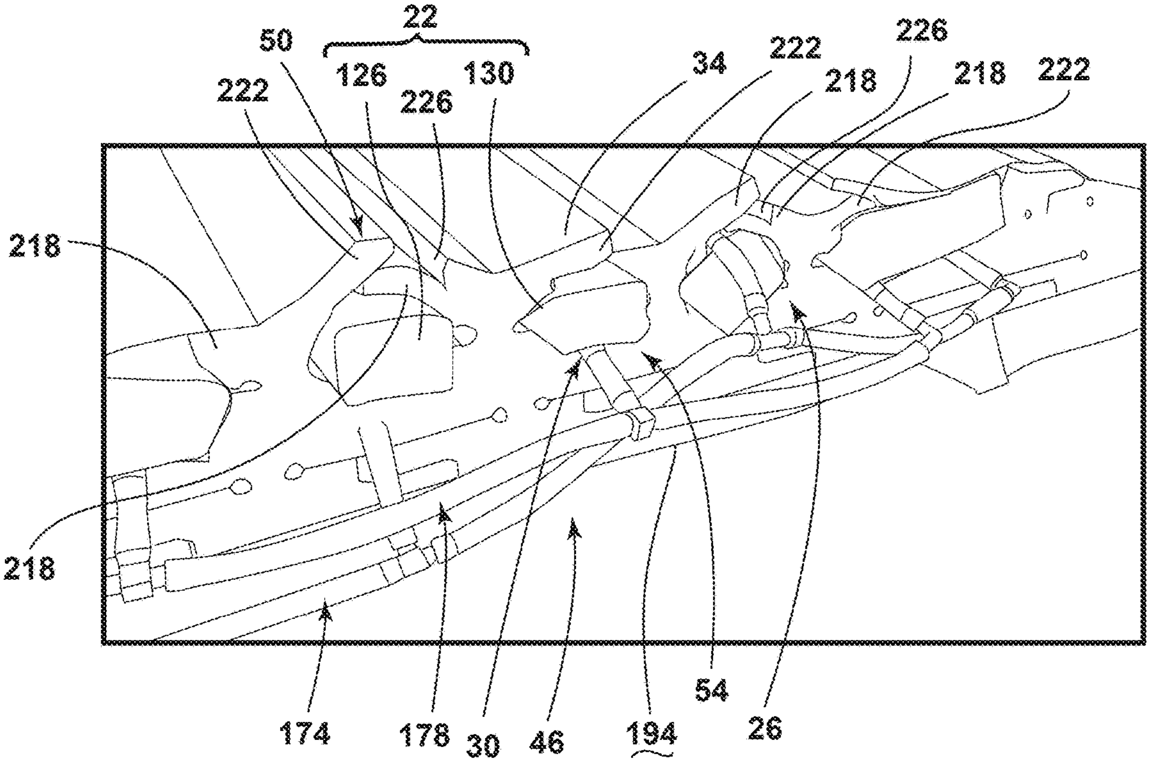
FIG. 14 is a top perspective view of a mattress defining grooves with a bladder disposed in each groove, according to the present disclosure.

Referring to FIG. 14, the first and second projections 218, 222 of adjacent flaps 34 may be configured to overlap. In such examples, the first projection 218 defines a notch 226 for receiving the second projection 222 of the adjacent flap 34. The shape and size of the notch 226 may be defined by the shape and size of the first projection 218. The notch 226 is configured to receive the second projection 222 when the flaps 34 are in the lowered position 54 to provide the uniform support surface 74. As the bladders 22 are adjusted to the deployed state 26, the first projection 218 and the second projection 222 may remain in contact and/or in an overlapped configuration. The bladders 22 between adjacent flaps 34 can be retained within the space defined by the first and second projections 218, 222 of adjacent flaps 34. The bladders 22 can rotate both the first and second projections 218, 222 disposed above the respective bladder 22 to form the irregular support surface 74.

Referring to FIGS. 1-14, the bladders 22 extend the entirety of the width of the mattress 14. This configuration is advantageous for providing the low pressure regions to an entire width of the body of the patient disposed on the mattress 14. The bladders 22 may be configured to adjust in one or more patterns selected through the user-interface 190. The bladders 22 operate to influence the shape of the support surface 74 of the mattress. Influencing or changing the shape of the support surface 74 can create a significant discharge of pressure between the patient and the mattress 14, which provides a variety of medical benefits, including, but not limited to, re-oxygenation of cells and increasing blood circulation.

The bladders 22 in the torso region 86 can be controlled simultaneously of or independently of the bladders 22 in the leg region 90 to provide more personalized treatment to the patient on the mattress 14. The mattress 14 can be operated in the non-powered condition and the powered condition. When in the non-powered condition, the mattress 14 can support the patient and provide greater comfort to the patient disposed thereon. When powered, the bladders 22 can be adjusted to create the localized discharge of pressure to enhance therapeutic benefits, for example, with alternating low pressure. In examples where the mattress 14 is used for alternative or alternating low pressure, the mattress 14 may provide a cycle to change an interface pressure between the patient and the mattress 14 to reduce longtime stress on the cells of the patient. The mattress 14 reduces the interface pressure on each body area of the patient during a portion of the cycle as well as minimizes peaks in pressure during a time of rest for the patient.

Use of the present disclosure may provide for a variety of advantages. For example, the bladders 22 in the compressed state 138 may provide a greater height difference between adjacent bladders 22 to increase the discharge of pressure. Additionally, having a bladder 22 in the compressed state 138 and an adjacent bladder 22 in the expanded state 134 increases the height difference between adjacent bladders 22, thereby, further increasing the discharge of pressure on the patient disposed on the mattress 14. Further, the flaps 34 rotating to the raised position 50 provides an increase in the height difference between adjacent flaps 34 in the lowered position 54. The increasing heights caused by adjacent bladders 22 and/or adjacent flaps 34 influences or changes the support surface 74 of the mattress to change the pressure felt by the patient disposed thereon. Moreover, a single pump 118 can be utilized to adjust the bladders 22 within the mattress 14. Additional benefits or advantages of using this device may also be realized and/or achieved.

The device disclosed herein is further summarized in the following paragraphs and is further characterized by combinations of any and all of the various aspects described therein.

According to one aspect of the present disclosure, a patient support apparatus includes a mattress that defines a plurality of grooves. A bladder is disposed within each groove. Each bladder is operable between a deployed state and a non-deployed state. A flap is disposed adjacent to each groove. Each flap includes a broad contact surface and a narrow contact surface. A manifold is in fluid communication with each bladder. The manifold is configured to direct fluid into each bladder to adjust the bladders between the deployed state and the non-deployed state, and consequently move the flaps between a raised position and a lowered position, respectively According to still another aspect, each flap is configured to rotate as bladders are adjusted to a deployed state.

According to yet another aspect, a broad contact surface of each flap includes a planar extent. The planar extent of adjacent flaps are generally co-planar.

According to another aspect, a broad contact surface of each flap includes a planar extent. The planar extent of adjacent flaps are generally parallel.

According to still another aspect, bladders include a first bladder and a second bladder. The first bladder is configured to be in a non-deployed state when the second bladder is in a deployed state.

According to yet another aspect, a first bladder and a second bladder are disposed at adjacent grooves.

According to another aspect, each flap includes a first projection and a second projection that extend in opposing directions.

According to still another aspect, each first projection defines a notch to receive a second projection of an adjacent flap.

According to another aspect of the present disclosure, a mattress system for a patient support apparatus includes a mattress that defines a groove. The mattress includes a base surface. A bladder is disposed within the groove. The bladder is operable between a deployed state and a non-deployed state. A flap is disposed adjacent to the groove. The flap is operable between a raised position and a lowered position. A manifold is configured to adjust the bladder between the deployed state and the non-deployed state. The flap rotates away from the base surface as the bladder is adjusted from the non-deployed state to the deployed state.

According to yet another aspect, a deployed state is an inflated condition and a non-deployed state is a deflated condition.

According to still another aspect, a flap has a proximal end and a distal end. The distal end is spaced-apart from a bladder when the bladder is in a deployed state.

According to another aspect, a flap tapers from a proximal end to a distal end.

According to yet another aspect, each flap includes a broad contact surface that has a planar extent. The planar extent of adjacent flaps are generally parallel.

According to still another aspect, a bladder extends at least partially out of a groove when in a deployed state.

According to another aspect, a groove is in fluid communication with an area external to a mattress.

According to yet another aspect of the present disclosure, a mattress system for a patient support apparatus includes a mattress that has a support surface. The mattress defines a cavity therein. A first bladder is disposed within the cavity. A second bladder is disposed within the cavity proximate the first bladder. Each of the first bladder and the second bladder are operable between an expanded state, a compressed state, and a neutral state. A pump is in fluid communication with each of the first bladder and the second bladder. The pump defines a first port and a second port. A manifold is in fluid communication with the first bladder, the second bladder, and the pump. The pump is configured to evacuate fluid from the first bladder when the manifold is in a first operating state and configured to evacuate fluid from the second bladder when the manifold is in a second operating state to influence a shape of the support surface of the mattress.

According to another aspect, a pump is configured to direct fluid into a second bladder when a manifold is in a first operating state. The pump is configured to direct fluid into a first bladder when in a second operating state.

According to still another aspect, a manifold defines a first fluid path between a first bladder and a first port when in a first operating state and a second fluid path between a second bladder and a second port when in the first operating state. The first fluid path is parallel to the second fluid path.

According to yet another aspect, a manifold defines a first fluid path between a first bladder and a second port when in a second operating state and a second fluid path between a second bladder and a first port when in a second operating state. The first fluid path and the second fluid path are in a crossing configuration.

According to another aspect, each of a first bladder and a second bladder include a core disposed within an outer membrane. The cores define a neutral state, respectively.

According to another aspect, a patient support apparatus includes a means for supporting a patient defining a plurality of grooves. A means for adjusting a support surface is disposed within each groove. The means for adjusting the support surface is operable between a deployed state and a non-deployed state. A means for adjusting pressure is disposed adjacent to each of the means for adjusting a support surface. The means for adjusting pressure includes a broad contact surface and a narrow contact surface. A means for fluidly coupling each means for adjusting the support surface is configured to direct fluid into each means for adjusting the support surface to adjust the means for adjusting the support surface between the deployed state and the non-deployed state, and consequently move the means for adjusting pressure between a raised position and a lowered position.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The various illustrative logical blocks, modules, controllers, and circuits described in connection with the embodiments disclosed herein may be implemented or performed with application specific integrated circuits (ASICs), field programmable gate arrays (FPGAs), general purpose processors, digital signal processors (DSPs) or other logic devices, discrete gates or transistor logic, discrete hardware components, or any combination thereof designed to perform the functions described herein. A general purpose processor may be any conventional processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A mattress system for a patient support apparatus, comprising:

a mattress having a support surface extending between a head end and a foot end, wherein the mattress defines a cavity therein extending from the head end to the foot end with the support surface extending over the cavity, the mattress having a head region at the head end, a leg region at the foot end, and a torso region between the head and leg regions;

a stationary support structure is disposed in the cavity at the head end;

first bladders disposed within the cavity in the torso region and the leg region;

second bladders disposed within the cavity in the torso region and the leg region proximate the first bladders, wherein the first and second bladders are arranged in an alternating pattern from adjacent to the stationary support structure in the torso region to the foot end, and wherein each of the first bladders and the second bladders is operable between an expanded state, a compressed state, and a neutral state, and wherein each of the first bladders and the second bladders includes:

an outer membrane defining a chamber; and a core disposed within the chamber, wherein the core defines a shape of the respective bladder when in the neutral state, the core configured to support a person on the mattress when the respective bladder is in the neutral state, and wherein fluid is directed into the chamber to adjust the respective bladder to the expanded state by moving the outer membrane from abutting a surface of the core toward the support surface to be at least partially spaced from the surface of the core when the respective bladder is in the expanded state to influence a shape of the support surface and contribute to a local discharge of pressure based on a height difference between the first and second bladders;

a retaining band disposed around the outer membrane of each bladder, respectively, wherein the retaining band defines the shape of the respective bladder in the expanded state;

a pump in fluid communication with each of the first bladders and the second bladders to evacuate fluid from and direct fluid to the first and second bladders for adjusting the first and second bladders between the compressed state, the neutral state, and the expanded state, wherein the pump defines a first port and a second port for simultaneously directing fluid in opposing directions relative to the first and second bladders; and a manifold in fluid communication between the pump and the first and second bladders, wherein the pump is configured to:

evacuate fluid from the first bladders via the first port to adjust the first bladders to the compressed state and compress the cores in the first bladders while directing fluid to the second bladders via the second port to adjust the second bladders to the expanded state with the outer membranes spaced from the cores when the manifold is in a first operating state;

evacuate fluid from the second bladders via the first port to adjust the second bladders to the compressed state and compress the cores in the second bladders while directing fluid to the first bladders via the second port to adjust the first bladders to the expanded state with the outer membranes spaced from the cores when the manifold is in a second operating state, and wherein the cores define the shape of the first and second bladders in the compressed state where the outer membranes are moved away from the support surface and the outer membranes define the shape of the first and second bladders in the expanded state to influence the shape of the support surface of the mattress;

adjust the first and second bladders in the torso region in a first pattern while adjusting the first and second bladders in the leg region in a second pattern; and adjust the first bladders in the torso region to the compressed state including adjusting the cores in the first bladders to a compressed condition and the second bladders in the torso region to the expanded state simultaneously while maintaining the first bladders in the leg region in the neutral state and adjusting the second bladders in the leg region to the compressed state.

2. The mattress system of claim 1, wherein the manifold defines a first fluid path between the first bladders and the first port when in the first operating state and a second fluid path between the second bladders and the second port when in the first operating state, and wherein the first fluid path is parallel to the second fluid path.

3. The mattress system of claim 2, wherein the manifold defines the first fluid path between the first bladders and the second port when in the second operating state and the second fluid path between the second bladders and the first port when in the second operating state, and wherein the first fluid path and the second fluid path are in a crossing configuration.

4. The mattress system of claim 1, wherein an upper surface of each of the first bladders and the second bladders are co-planar when the first bladders and the second bladders are each in the neutral state.

5. The mattress system of claim 1, wherein the core is operable between a neutral condition and the compressed condition, wherein the neutral condition of the core defines the shape of the first and second bladders when in the neutral state to form a flat condition of the support surface between the stationary support structure and the foot end, wherein the compressed condition of the core defines the shape of the first and second bladders when in the compressed state, and wherein the chambers are configured to receive the fluid, which consequently moves the outer membranes away from the cores, to adjust the first bladders and the second bladders, respectively, to the expanded state to move the support surface and influence the shape of the support surface to contribute to the local discharge of pressure.

6. The mattress system of claim 1, wherein a first height difference is defined when the first bladders are in the compressed state and the second bladders are in the expanded state and a second height difference is defined when the first bladders are in the compressed state and the second bladders are in the neutral state, the first height difference being greater than the second height difference to contribute to a greater local discharge of pressure between the person and the mattress compared to the second height difference.

7. The mattress system of claim 1, wherein the manifold includes a connector configured to adjust the manifold between the first operating state and the second operating state.

8. The mattress system of claim 1, wherein the retaining band disposed around the outer membrane of each of the first bladders and the second bladders is spaced from the respective outer membrane when the first bladders and the second bladders are in the compressed state, respectively.

9. The mattress system of claim 1, wherein the pump is configured to evacuate fluid from the first bladders and the second bladders and compress the cores as the first bladders and the second bladders are adjusted to the compressed state, and wherein the cores are configured to expand as the first bladders and the second bladders adjust to at least one of the neutral state and the expanded state, and further wherein the pump is configured to also direct fluid into the first and second bladders to adjust the first and second bladders to the expanded state.

10. The mattress system of claim 1, further comprising:

a controller communicatively coupled to the pump and the manifold, wherein the controller is configured to control the pump and the manifold to continually adjust a first fluid path and a second fluid path and, consequently, continually adjust the first bladders and the second bladders between the compressed state and the expanded state, wherein the first bladders are in the compressed state when the second bladders are in the expanded state and the first bladders are in the expanded state when the second bladders are in the compressed state.

11. The mattress system of claim 1, wherein each of the first bladders and the second bladders are elongated and extend from a first side of the mattress to a second opposing side of the mattress to define a width, and wherein a width of the retaining band is less than the width of the first and second bladders.

12. The mattress system of claim 1, wherein the first bladders are in the compressed state with the cores in the first bladders being in the compressed condition and the second bladders are in the expanded state with the cores of the second bladders being in a neutral condition when the manifold is in the first operating state.

13. The mattress system of claim 12, wherein the first bladders are in the expanded state and the second bladders are in the compressed state when the manifold is in the second operating state, and wherein the manifold is configured to alternate between the first operating state and the second operating state.

14. The mattress system of claim 1, wherein upper surfaces of the first and second bladders are flat when the first and second bladders are in the neutral state and the compressed state, and wherein the upper surfaces are rounded when the first and second bladders are in the expanded state.

15. The mattress system of claim 1, wherein a length of each of the first and second bladders is defined in a direction between the head end and the foot end, and wherein the length of the first and second bladders proximate to the foot end is less than the length of the first and second bladders proximate to the stationary support structure.

16. The mattress system of claim 1, wherein the stationary support structure has a first end at the head end and a second end adjacent to one of the first bladders in the torso region, and wherein the stationary support structure extends across the head region and is disposed outside of the torso region, and further wherein the first and second bladders are arranged outside of the head region.

17. The mattress system of claim 1, wherein the pump is configured to simultaneously and independently adjust the first and second bladders in the torso region in the first pattern and the first and second bladders in the leg region in the second pattern, the second pattern being different than the first pattern, and further wherein the first bladders in the torso region are configured to simultaneously adjust to a different state than the first bladders in the leg region, and wherein the second bladders in the torso region are configured to simultaneously adjust to a different state than the second bladders in the leg region.

18. A mattress system for a patient support apparatus, comprising:

a mattress having a support surface extending between a head end and a foot end, wherein the mattress defines a cavity therein extending from the head end to the foot end with the support surface extending over the cavity, the mattress having a head region at the head end, a leg region at the foot end, and a torso region between the head and leg regions;

a stationary support structure is disposed in the cavity at the head end;

first bladders disposed within the cavity in the torso region and the leg region;

second bladders disposed within the cavity in the torso region and the leg region proximate the first bladders, wherein the first and second bladders are arranged in an alternating pattern from adjacent to the stationary support structure in the torso region to the foot end, and wherein each of the first bladders and the second bladders is operable between an expanded state, a compressed state, and a neutral state, and wherein each of the first bladders and the second bladders includes:

an outer membrane defining a chamber; and a core disposed within the chamber, wherein the core defines a shape of the respective bladder when in the neutral state, the core configured to support a person on the mattress when the respective bladder is in the neutral state, and wherein fluid is directed into the chamber to adjust the respective bladder to the expanded state by moving the outer membrane from abutting a surface of the core toward the support surface to be at least partially spaced from the surface of the core when the respective bladder is in the expanded state to influence a shape of the support surface and contribute to a local discharge of pressure based on a height difference between the first and second bladders;

a retaining band disposed around the outer membrane of each bladder, respectively, wherein the retaining band defines the shape of the respective bladder in the expanded state;

a pump in fluid communication with each of the first bladders and the second bladders to evacuate fluid from and direct fluid to the first and second bladders for adjusting the first and second bladders between the compressed state, the neutral state, and the expanded state, wherein the pump defines a first port and a second port for simultaneously directing fluid in opposing directions relative to the first and second bladders; and a manifold in fluid communication between the pump and the first and second bladders, wherein the pump is configured to:

evacuate fluid from the first bladders via the first port to adjust the first bladders to the compressed state and compress the cores in the first bladders while directing fluid to the second bladders via the second port to adjust the second bladders to the expanded state with the outer membranes spaced from the cores when the manifold is in a first operating state;

evacuate fluid from the second bladders via the first port to adjust the second bladders to the compressed state and compress the cores in the second bladders while directing fluid to the first bladders via the second port to adjust the first bladders to the expanded state with the outer membranes spaced from the cores when the manifold is in a second operating state, wherein the cores define the shape of the first and second bladders in the compressed state where the outer membranes are moved away from the support surface and the outer membranes define the shape of the first and second bladders in the expanded state to influence the shape of the support surface of the mattress; and evacuate fluid from the first bladders and compress the cores while the second bladders are retained in the neutral state to define a first height difference between the first and second bladders and evacuate fluid from the first bladders to adjust the first bladders to the compressed state while directing fluid to the second bladders to adjust the second bladders to the expanded state to define a second height difference between the first and second bladders, wherein the manifold is configured to disrupt fluid communication between the pump and the first and second bladders to adjust the first and second bladders to the neutral state.

19. A mattress system for a patient support apparatus, comprising:

a mattress having a support surface extending between a head end and a foot end, wherein the mattress defines a cavity therein extending from the head end to the foot end with the support surface extending over the cavity, the mattress having a head region at the head end, a leg region at the foot end, and a torso region between the head and leg regions;

a stationary support structure is disposed in the cavity at the head end;

first bladders disposed within the cavity in the torso region and the leg region;

second bladders disposed within the cavity in the torso region and the leg region proximate the first bladders, wherein the first and second bladders are arranged in an alternating pattern from adjacent to the stationary support structure in the torso region to the foot end, and wherein each of the first bladders and the second bladders is operable between an expanded state, a compressed state, and a neutral state, and wherein each of the first bladders and the second bladders includes:

an outer membrane defining a chamber; and a core disposed within the chamber, wherein the core defines a shape of the respective bladder when in the neutral state, the core configured to support a person on the mattress when the respective bladder is in the neutral state, and wherein fluid is directed into the chamber to adjust the respective bladder to the expanded state by moving the outer membrane from abutting a surface of the core toward the support surface to be at least partially spaced from the surface of the core when the respective bladder is in the expanded state to influence a shape of the support surface and contribute to a local discharge of pressure based on a height difference between the first and second bladders;

a retaining band disposed around the outer membrane of each bladder, respectively, wherein the retaining band defines the shape of the respective bladder in the expanded state;

a pump in fluid communication with each of the first bladders and the second bladders to evacuate fluid from and direct fluid to the first and second bladders for adjusting the first and second bladders between the compressed state, the neutral state, and the expanded state, wherein the pump defines a first port and a second port for simultaneously directing fluid in opposing directions relative to the first and second bladders; and a manifold in fluid communication between the pump and the first and second bladders, wherein the pump is configured to:

evacuate fluid from the first bladders via the first port to adjust the first bladders to the compressed state and compress the cores in the first bladders while directing fluid to the second bladders via the second port to adjust the second bladders to the expanded state with the outer membranes spaced from the cores when the manifold is in a first operating state; and evacuate fluid from the second bladders via the first port to adjust the second bladders to the compressed state and compress the cores in the second bladders while directing fluid to the first bladders via the second port to adjust the first bladders to the expanded state with the outer membranes spaced from the cores when the manifold is in a second operating state, and wherein the cores define the shape of the first and second bladders in the compressed state where the outer membranes are moved away from the support surface and the outer membranes define the shape of the first and second bladders in the expanded state to influence the shape of the support surface of the mattress, and further wherein the manifold is configured to disrupt fluid communication between the pump and the first bladders to adjust the first bladders to the neutral state.

* * * * *